United States Patent
Zhang

(10) Patent No.: US 10,175,861 B2
(45) Date of Patent: Jan. 8, 2019

(54) METHOD AND SYSTEM FOR WEB PAGE COMMENTING, BROWSER AND STORAGE MEDIUM

(71) Applicant: Tencent Technology (Shenzhen) Company Limited, Shenzhen (CN)

(72) Inventor: Yu Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 708 days.

(21) Appl. No.: 14/314,749

(22) Filed: Jun. 25, 2014

(65) Prior Publication Data

US 2014/0380173 A1 Dec. 25, 2014

Related U.S. Application Data

(63) Continuation of application No. PCT/CN2014/075820, filed on Apr. 21, 2014.

(30) Foreign Application Priority Data

Jun. 21, 2013 (CN) .......................... 2013 1 0250140

(51) Int. Cl.
*G06F 3/048* (2013.01)
*G06F 3/0484* (2013.01)
(Continued)

(52) U.S. Cl.
CPC .......... *G06F 3/0484* (2013.01); *G06F 17/241* (2013.01); *G06F 17/30861* (2013.01)

(58) Field of Classification Search
CPC . G06F 17/241; G06F 17/30861; G06F 3/0484
See application file for complete search history.

(56) References Cited

U.S. PATENT DOCUMENTS 8,640,023 B1 * 1/2014 Murray ............. G06F 17/30873
715/230
8,881,257 B2 11/2014 Cha et al.
(Continued)

FOREIGN PATENT DOCUMENTS

| CN | 101515968 A | 8/2009 |
| CN | 101651745 A | 2/2010 |

(Continued)

OTHER PUBLICATIONS

International Search Report issued in PCT/CN2013/090665, dated Apr. 3, 2014, 4 pages.

(Continued)

*Primary Examiner* — Thanh T Vu
(74) *Attorney, Agent, or Firm* — Oblon, McClelland, Maier & Neustadt, L.L.P.

(57) ABSTRACT

Disclosed are a method and a system for web page commenting, a browser and a storage medium, and the method comprises: displaying a web page content and providing a comment control used for adding a comment containing a comment content on the web page content; detecting a comment adding instruction generated by the comment control; and sending the comment content and a web page identifier corresponding to the web page content to a server storing comments, if the comment adding instruction is detected. By the technical solutions according to the embodiments of the disclosure, a user is allowed to view the comments made by other users on the web page content, and make a comment on the web page content.

18 Claims, 8 Drawing Sheets

(51) Int. Cl.
  *G06F 17/30* (2006.01)
  *G06F 17/24* (2006.01)

(56) References Cited

U.S. PATENT DOCUMENTS

| | | |
|---|---|---|
| 2002/0023215 A1 | 2/2002 | Wang et al. |
| 2005/0195956 A1 | 9/2005 | Kass |
| 2007/0266118 A1 | 11/2007 | Wilkins |
| 2009/0265607 A1* | 10/2009 | Raz .................... G06F 17/2288 715/233 |
| 2011/0055585 A1 | 3/2011 | Lee |
| 2011/0314111 A1 | 12/2011 | Wang et al. |
| 2012/0032945 A1 | 2/2012 | Dare et al. |
| 2013/0013931 A1 | 1/2013 | O'Hare et al. |
| 2013/0275530 A1 | 10/2013 | Matson et al. |
| 2014/0026025 A1* | 1/2014 | Smith .................. G06Q 10/101 715/230 |
| 2014/0324912 A1 | 10/2014 | Lei |

FOREIGN PATENT DOCUMENTS

| | | |
|---|---|---|
| CN | 101895609 A | 11/2010 |
| CN | 102006358 A | 4/2011 |
| CN | 102104603 A | 6/2011 |
| CN | 102289489 A | 12/2011 |
| CN | 102779137 A | 11/2012 |
| CN | 102968487 A | 3/2013 |
| CN | 103164456 A | 6/2013 |
| WO | WO 2011/091313 A1 | 7/2011 |

OTHER PUBLICATIONS

International Search Report issued in PCT/CN2014/075820, dated Jul. 18, 2014, 4 pages.

Delzanno et al., "Automatic Verification of Time Sensitive Cryptographic Protocols", 2004, Springer-Verlag.

P. Krzyzanowski, "Lectures on Distributed Systems—Cryptographic Communication and Authentication", 2009, Rutgers University—CS 417: Distributed Systems, retrieved from the Internet Sep. 28, 2016, https://www.cs.rutgers.edu/~pxklrutgers/notes/content/13-crypto.pdf.

Office Action with Translation issued for Chinese Application No. 201310250140.X dated Sep. 19, 2017.

* cited by examiner

METHOD AND SYSTEM FOR WEB PAGE COMMENTING, BROWSER AND STORAGE MEDIUM

CROSS-REFERENCE TO RELATED APPLICATION

This application is a continuation application of PCT Patent Application No. PCT/CN2014/075820, entitled "METHOD AND SYSTEM FOR WEB PAGE COMMENTING, BROWSER AND STORAGE MEDIUM" filed on Apr. 21, 2014, which claims priority to Chinese Patent Application No. 201310250140.X, entitled "METHOD AND SYSTEM FOR WEB PAGE COMMENTING, AND BROWSER" filed on Jun. 21, 2013, contents of both of which are incorporated by reference in their entireties.

TECHNICAL FIELD

The present disclosure relates to the field of computer network technologies, and in particular, to a method and a system for web page commenting, a browser and a storage medium.

BACKGROUND

A browser, e.g. a browser program at the client side, may send various requests to a World Wide Web (WWW) server, and interpret, display and play hypertext information (for example, a Hypertext Markup Language (HTML) page) and various multimedia data returned from the WEB server.

In the prior art, when users browse information on an Internet web site via browsers, the intercommunion and interaction between the users is conducted via a message board function provided by the web page per se. However, not all the web sites provide such message board function. Furthermore, a user is allowed to leave a message only after registering with the web site. As a result, the web site development is more complicated, and the user is bothered by the registration with the web site.

SUMMARY

Therefore, embodiments of the disclosure provide a method and a system for web page commenting, a browser and a storage medium, so as to solve the technical problem of the prior art that comments on a web page can only be made via a message board function provided by the web page per se.

In a first aspect, an embodiment of the disclosure provides a method for web page commenting, which is run on a terminal, including:

displaying a web page content and providing a comment control used for adding a comment on the web page content, wherein the added comment contains a comment content;

detecting a comment adding instruction generated at the comment control;

acquiring the comment content from the comment control in response to the detected comment adding instruction; and sending the comment content and a web page identifier corresponding to the web page content to a server storing comments, wherein each web page identifier uniquely identifies one web page.

In a second aspect, an embodiment of the disclosure provides a browser operable on a terminal, including:

a displaying unit, which is configured to display a web page content and provide a comment control used for adding a comment on the web page content, wherein the comment added contains a comment content;

a signal detecting unit, which is configured to detect a comment adding instruction generated at the comment control;

a comment content acquiring unit, which is configured to acquire comment content from the comment control if the comment adding instruction is detected by the signal detecting unit; and a comment uploading unit, which is configured to send the comment content and a web page identifier corresponding to the web page content to a server storing comments, wherein, each web page identifier uniquely identifies one web page.

In a third aspect, an embodiment of the disclosure provides a system for web page commenting, which includes a server and at least one terminal, where:

the terminal is configured to display a web page content and provide a comment control used for adding a comment on the web page content, and detect a comment adding instruction generated by the comment control, wherein the added comment contains a comment content;

the terminal is further configured to, if detecting the comment adding instruction, acquire comment content from the comment control, and send the comment content and a web page identifier corresponding to the web page content to a server storing comments, wherein, each web page identifier uniquely identifies one web page; and the server is configured to receive and store the comment content and the web page identifier corresponding to the web page content.

In a fourth aspect, an embodiment of the disclosure provides a non-transitory storage medium containing computer-executable instructions, which, when executed by a computer processor, are configured to perform the above method for web page commenting.

In the method and the system for web page commenting, the browser and the storage medium according to the embodiments of the disclosure, a comment control used for adding a comment on the web page content is provided, the comment content is acquired from the comment control when a comment adding instruction generated by the comment control is detected, and both the comment content and a web page identifier corresponding to the web page content are sent to a server storing comments, so that a user can make a comment on a web page content without registering, to solve the technical problem of the prior art that comments on a web page can only be made via a message board function provided by the web page per se.

DETAILED DESCRIPTION OF THE EMBODIMENTS

In order to make the technical problems to be solved by the disclosure, the technical solutions employed and the technical effects to be attained more apparent, the technical solutions in the embodiments of the disclosure will be further described in detail below in conjunction with the drawings. Apparently, the embodiments described herein form a part not all of the embodiments of the disclosure. All the other embodiments obtained by one of ordinary skills in the art in light of the described embodiments of the disclosure without creative work pertain to the protection scope of the disclosure.

Figure 1:
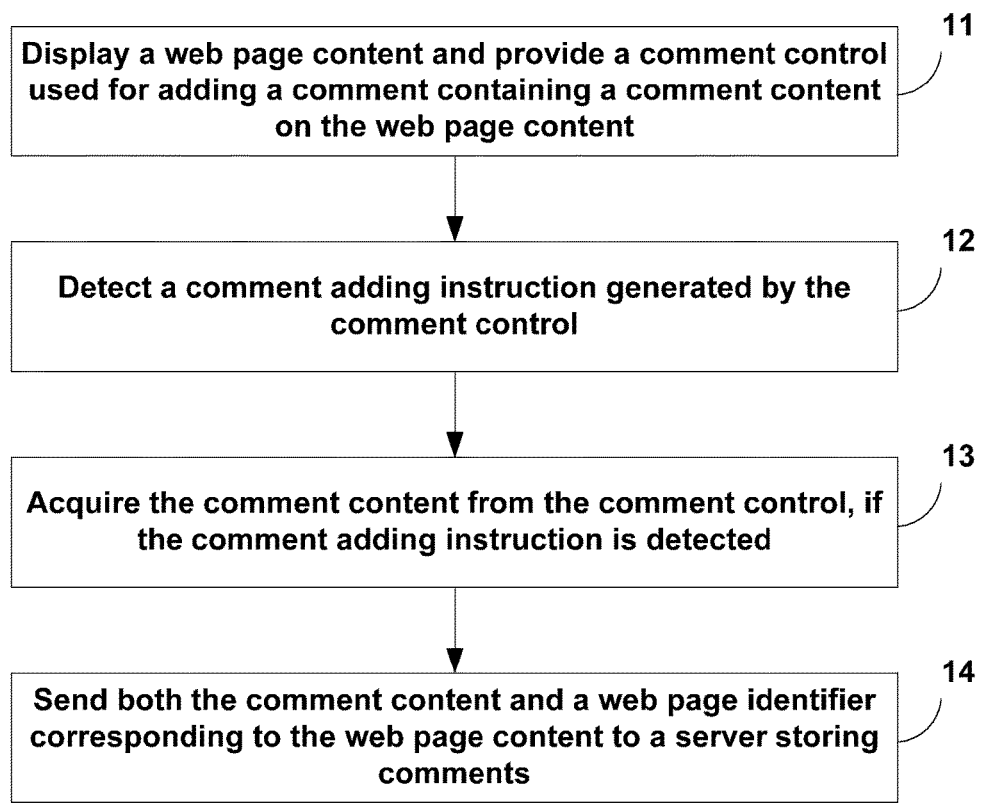
FIG. 1 is a flow chart of a method for web page commenting according to an embodiment of the disclosure.

The technical solutions of the disclosure will be further illustrated below via specific embodiments in conjunction with the drawings FIG. 1 is a flow chart of a method for web page commenting according to an embodiment of the disclosure, and the method is operable on a terminal such as a mobile phone and a computer. As shown in FIG. 1, the method for web page commenting includes Steps 11 to 14 below.

At Step 11, a web page content is displayed, and a comment control, which is used for adding a comment containing comment contents on the web page content, is provided.

For example, after a user inputs a web address to an address bar of a browser running on a terminal and clicks an open button, the browser running on a terminal receives the web page content corresponding to the web address and parses the web page content as the content to be displayed by a display of the terminal, i.e., a web page.

The browser may provide a comment control for adding a comment on the web page content. For example, a web page commenting button is arranged on a plugin bar of the browser, and the browser displays a web page commenting interface after the user clicks the web page commenting button, where an input box for inputting a comment content is displayed on the web page commenting interface, and a comment submitting button is arranged outside the input box.

Herein, the added comment may include a reply to a previous comment, so that the interaction between users may be realized.

At Step 12, it is detected whether a comment adding instruction is generated by the comment control.

For example, the browser detects in real time whether the comment submitting button is clicked; and if the comment submitting button is clicked, the comment adding instruction is generated.

At Step 13, if the comment adding instruction is detected, the comment content is acquired from the comment control.

For example, the user clicks on the web page commenting button, subsequently inputs a comment content in the input box on the web page commenting interface displayed by the browser, and then clicks on the comment submitting button outside the input box, so that a comment adding instruction is generated. The browser acquires the comment content inputted by the user in response to the detected comment adding instruction.

At Step 14, both the comment content and a web page identifier corresponding to the web page content are sent to a server storing comments.

For example, after detecting the comment adding instruction, the browser establishes a communication connection with the server storing comments, and sends both the acquired comment content and the web page identifier corresponding to the web page content to the server storing comments through the established communication connection. The server corresponds to the browser providing the comment control, and provides a uniform commenting platform for web pages on various platforms. Each web page identifier, such as a web address or Uniform Resource Location (URL), is configured to uniquely identify one web page.

In the method for web page commenting according to the present embodiment, a comment may be made on a web page content via a comment control and a commenting platform is provided for various web pages by a dedicated server, to solve the problem of the prior art that comments can be made on some web pages only after registering and logging on web sites corresponding to the web pages, i.e. the problem of the prior art that comments are made on a web page only by a message board function provided by the web page per se. Thereby, the convenience and openness for commenting on web pages may be further improved.

Figure 2:
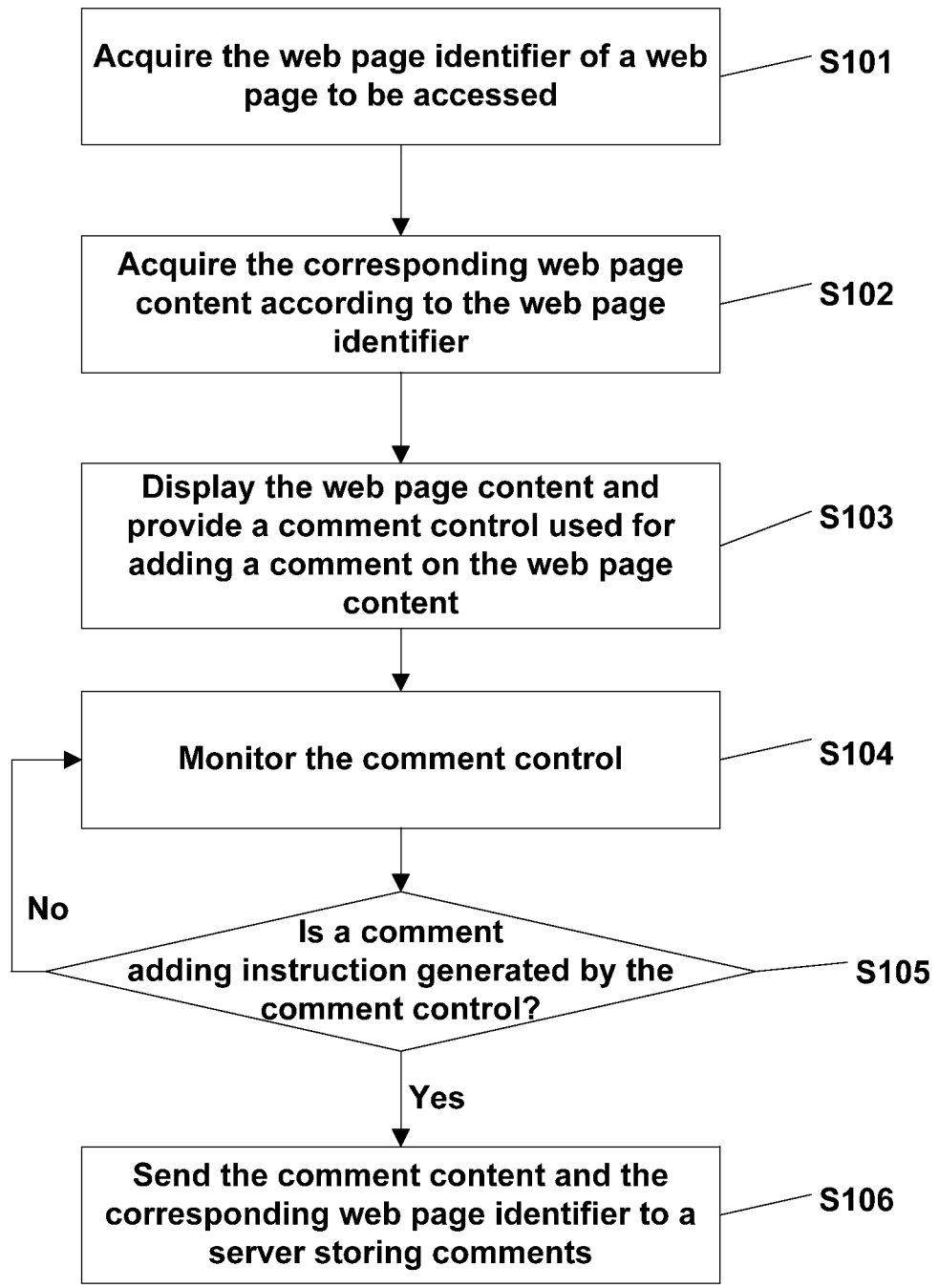
FIG. 2 is a flow chart of a method for web page commenting according to an embodiment of the disclosure.

An embodiment provides a method for web page commenting. FIG. 2 is a flow chart of a method for web page commenting according to the present embodiment of the disclosure. As shown in FIG. 2, the method for web page commenting according to this embodiment includes the following Steps S101 to S106.

Step S101: acquiring a web page identifier of a web page to be accessed.

The method according to the present embodiment is based on a WWW server (which is referred to as server for short hereinafter) and a terminal on which a browser is installed. Generally, the server is capable of querying, according to a web page identifier (for example, a web address) of a web page to be accessed, the web page content corresponding to a web page identifier, just like an ordinary WWW server, but further storing comments on the web page, herein, the comment includes a comment content, and the comment that corresponds to the web page corresponding to the web page identifier can be searched out via the web page identifier.

Step S102: acquiring the corresponding web page content according to the web page identifier.

The browser at the terminal, just like an ordinary browser, includes an address bar for receiving a web page identifier (for example, a web page URL input box). The terminal receives a web page identifier inputted by the user, establishes a connection with the WWW server, and acquires a web page content corresponding to the web page identifier from the web site server corresponding to the web page identifier according to the web page identifier.

Step S103: displaying the web page content and providing a comment control for adding a comment on the web page content.

The terminal displays the web page content on a web page of the browser and provides a comment control for adding new comments, and the comment control may include an editing control (for example, an editable text box) for editing the comment contents of new comments and a comment saving control (for example, a button) for saving the new comments. For example, a control for text editing is provided along with a button below the web page content on a web page of the browser at the terminal, to enable the user to add and submit a comment content.

Step S104: monitoring the comment control.

Step S105: determining whether a comment adding instruction is generated by the comment control; and if the comment adding instruction is generated by the comment control, performing Step S106; otherwise, performing Step S104.

Step S106: sending the comment content and the corresponding web page identifier to a server storing comments.

If the comment saving control receives a trigger signal, i.e., a comment adding instruction, the new comment is sent to the server, where the comment content of the new comment is the content inputted to the editing control.

Moreover, the method for web page commenting may further include: sending the attribute of the added comment to the server storing comments.

The attribute of the added comment may include comment source information, which is used for distinguishing between sources of various comments and may be, for example, a user name of the browser at the terminal or a terminal identifier such as a mobile phone serial number. At this step, the terminal sends the user name of the browser at the terminal or the terminal identifier to the server along with the new comment.

Because the browser, which typically is an open tool, does not require a user to register or log on beforehand, the comment source information may be a terminal identifier in this embodiment.

Moreover, the attribute of the comment may further include comment time, so that different comments may be distinguished by the time when the comments are submitted. At this step, the current time is sent as the comment time to the server along with the new comment.

Moreover, the added comment may be a reply to a previous comment, in addition to the comment on the web page content corresponding to the web page identifier. Therefore, a comment that is a reply to another comment (which is referred to as a parent comment) is referred to as a sub-comment, and the attribute of the sub-comment further includes the identifier of the parent comment. Thus, at this step, the parent comment of a sub-comment needs to be stored along with the sub-comment.

In order to enable a user to browse all the comments on the web page content corresponding to the web page identifier, a comment interaction entry for displaying all the comments on the web page content corresponding to the web page identifier may be provided on the page. For example, a menu or a button is disposed on the web page corresponding to the web page identifier, so that the browser initiates an access request to the server and acquires and displays all the comments on the web page content corresponding to the web page identifier, when the menu is click or the button is triggered. Moreover, in order to instantaneously display the new comment submitted by a user, the comment on the web page corresponding to the web page identifier is retrieved from the server and displayed after this step.

Figure 3:
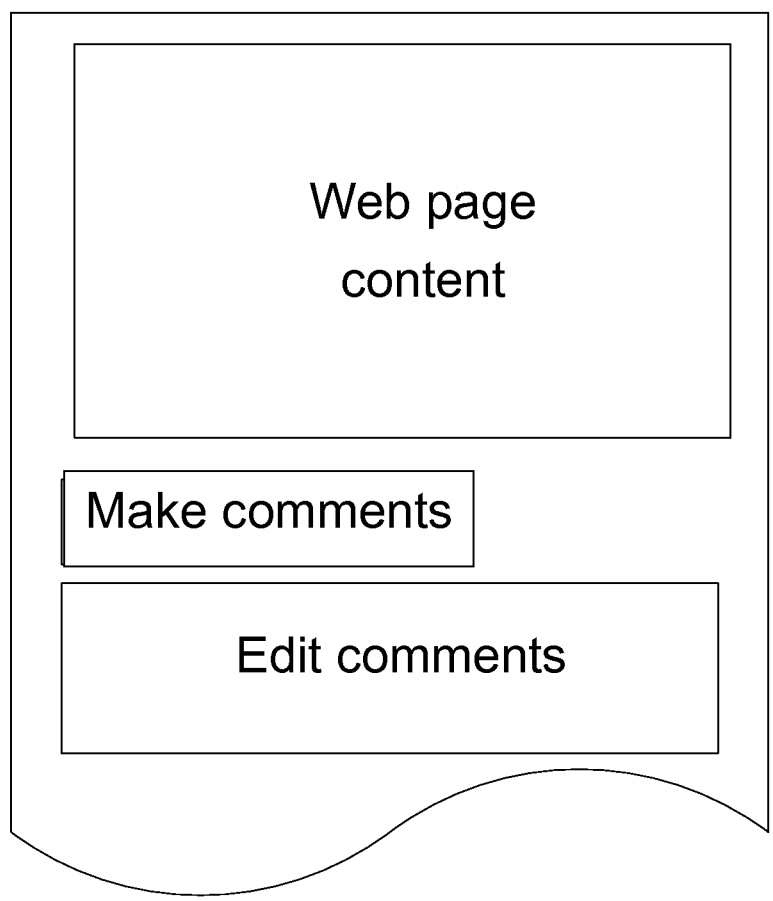
FIG. 3 is a schematic diagram showing the implementation of the method for web page commenting according to the embodiment of the disclosure.

In the method for web page commenting according to this embodiment, a schematic displayed page for the implementation of the method is shown in FIG. 3, and all modifications, equivalent substitutions and improvements made without departing from the concept and principle of the method according to this embodiment pertain to the scope of this embodiment.

In the method for web page commenting according to this embodiment, a comment control for adding a new comment is provided on a web page when the web page content is displayed, so that a user can submit a comment on the web page content via the comment control; moreover, after submitting the comment on the web page content, the user can browse the comment history of the web page content via a comment interaction entry.

Figure 4:
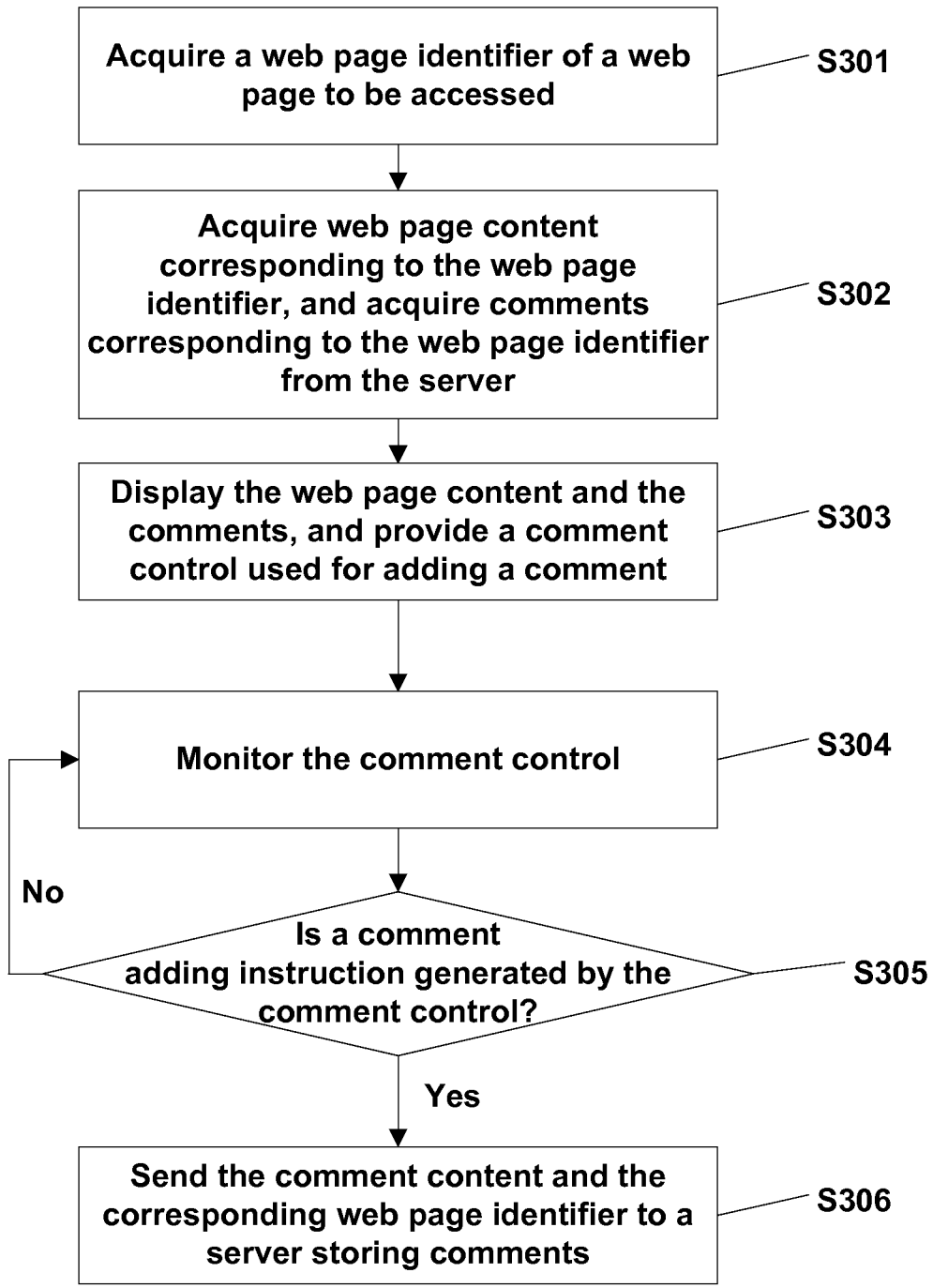
FIG. 4 is a flow chart of a method for web page commenting according to another embodiment of the disclosure.

Another embodiment provides a method for web page commenting. FIG. 4 is a flow chart of a method for web page commenting according to the another embodiment of the disclosure. As shown in FIG. 4, the method for web page commenting according to the present embodiment is operable on a terminal and includes the following Steps S301 to S306.

Step S301: acquiring a web page identifier of a web page to be accessed.

The method according to this embodiment is based on a WWW server and a terminal on which a browser is installed. Generally, the server is capable of querying, according to a web page identifier (for example, a web address) of a web page to be accessed, the web page content corresponding to a web page identifier, just like an ordinary WWW server, but further storing comments on the web page, herein, the comment includes a comment content, and the comment that corresponds to the web page corresponding to the web page identifier can be searched out via the web page identifier.

Step S302: acquiring the web page content corresponding to the web page identifier, and acquiring a comment corresponding to the web page identifier from the server.

The browser at the terminal, just like an ordinary browser, includes an address bar for receiving a web page identifier (for example, a web page URL). The terminal receives a web page identifier inputted by the user, establishes a connection with a web site server corresponding to the web page identifier, and acquires the web page content corresponding to the web page identifier from the web site server according to the web page identifier; moreover, the terminal establishes a connection with a server storing comments and acquires a comment corresponding to the web page identifier from the server storing comments.

Step S303: displaying the web page content and the comment, and providing a comment control for adding a comment.

The terminal displays the web page content and the comment on a web page of the browser. For example, the terminal displays the web page content at the upper part of the web page and displays all or a part of the comments corresponding to the web page identifier at the lower part of the web page.

Step S304: monitoring the comment control.

Step S305: determining whether a comment adding instruction is generated by the comment control; and if a comment adding instruction is generated by the comment control, performing Step S306; otherwise, performing Step S304.

Step S306: sending the comment content and the corresponding web page identifier to a server storing comments.

For example, the generation of a comment adding instruction at the comment control means that the user has inputted a comment content via the comment control and has submitted the comment content by clicking on a comment submitting button. When the user clicks on the comment submitting button, the browser receives the comment adding instruction by the comment control, acquires the comment content inputted by the user, and sends the comment content to a server storing comments.

Moreover, the method for web page commenting may further include: sending the attribute of the added comment to the server.

Herein, the attribute of the comment may include comment source information such as the user name of the browser at the terminal or the terminal identifier (for example, a mobile phone serial number). In this step, the user name of the browser or the terminal identifier is sent along with the comment content to the server. Thus, the attribute of the comment is stored along with the comment content at the server, so that the acquired comment content may be displayed at the terminal along with the attribute of the comment. For example, in Step S303, displaying the web page content and the comment may further include: displaying the comment content of the comment as well as the user name of the browser or the terminal identifier.

Because the browser, which typically is an open tool, does not require a user to register or log on beforehand, the comment source information may be a terminal identifier in this embodiment.

Moreover, the attribute of the comment may further include comment time, so that different comments may be distinguished by the time when the comments are submitted. At this step, when the comment content is sent to the server, the current time is added as the comment time. At Step S303, displaying the web page content and the comment may further include: displaying the comment time of the comment.

Moreover, the added comment may be a reply to a previous comment, in addition to the comment on the web page content corresponding to the web page identifier. Therefore, a comment that is a reply to another comment (which is referred to as a parent comment) is referred to as a sub-comment, and the attribute of the sub-comment further includes the identifier of the parent comment. In this case, acquiring the web page content corresponding to the web page identifier and the comment corresponding to the web page identifier according to the web page identifier at Step S302 further includes: acquiring the parent comment of each sub-comment; and displaying the web page content and the comment at the step S303 further includes: displaying all the sub-comments of each parent comment under the parent comment in a hierarchical manner, where subordinate sub-comments of a certain sub-comment, if any, are displayed under the sub-comment in a hierarchical manner, and so on.

Moreover, in order to instantaneously display the comment content submitted by the user, Step S302 is performed after Step S306.

Figure 5:
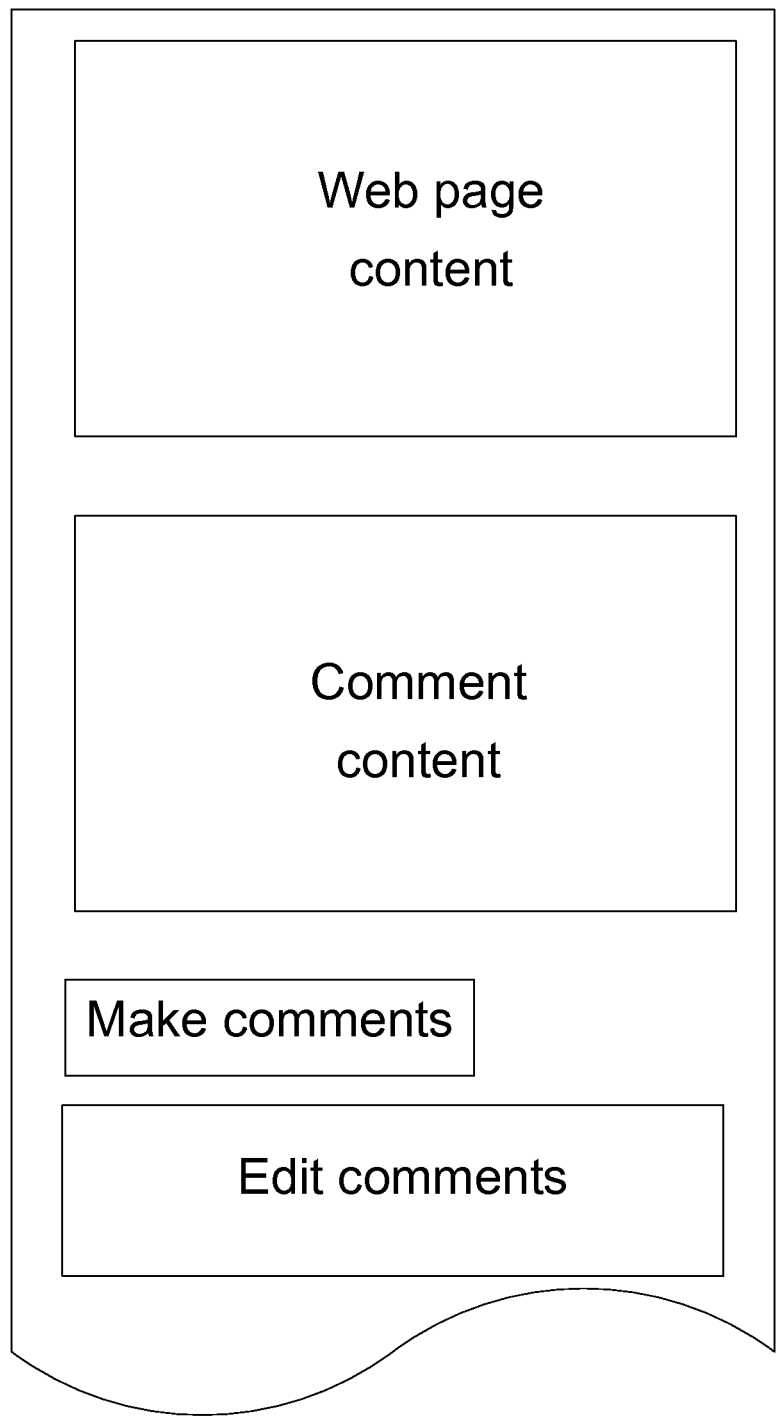
FIG. 5 is a schematic diagram showing the implementation of the method for web page commenting according to the another embodiment of the disclosure.

In the method for web page commenting according to this embodiment, a schematic displayed page for the implementation of the method is shown in FIG. 5, and all modifications, equivalent substitutions and improvements made without departing from the concept and principle of the method according to this embodiment pertain to the scope of this embodiment.

In the method for web page commenting according to this embodiment, the historical comments may be referred by the user to decide whether to read the current web page content, and the comment control is used by the user to submit the comment on the web page content. Here, the historical comments of other users on the web page are displayed along with the web page content and the comment control for adding a comment content is provided, a user may comment on the web page content after reviewing the comments of other users on the web page content.

Figure 6:
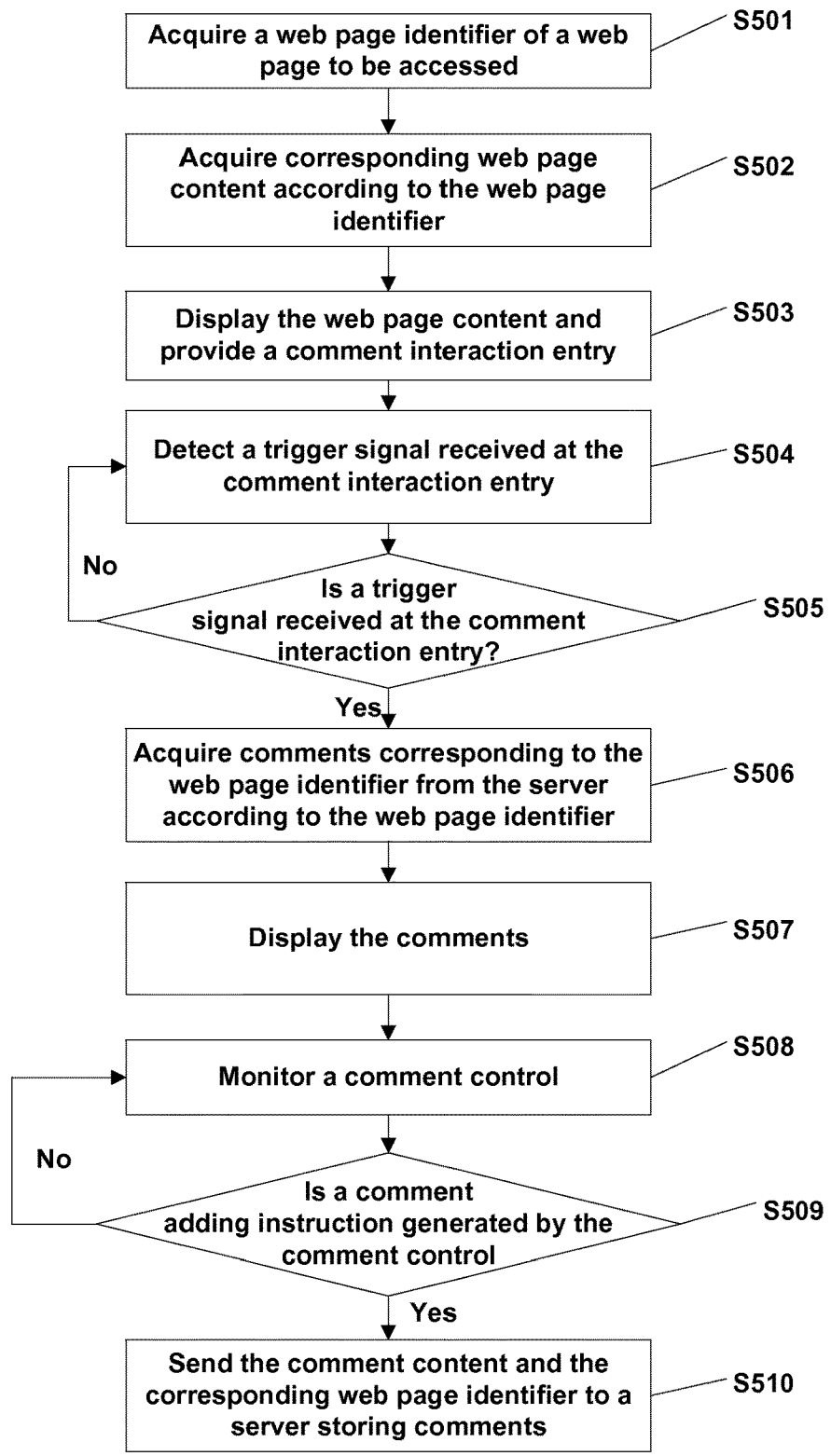
FIG. 6 is a flow chart of a method for web page commenting according to still another embodiment of the disclosure.

FIG. 6 is a flow chart of a method for web page commenting according to still another embodiment of the disclosure. As shown in FIG. 6, the method for web page commenting according to this embodiment includes the following Steps S501 to S510.

Step S501: acquiring a web page identifier of a web page to be accessed.

The method according to this embodiment is based on a WWW server and a terminal on which a browser is installed. Generally, the server is capable of querying, according to a web page identifier of a web page to be accessed, the web page content corresponding to a web page identifier, just like an ordinary WWW server, but further storing comments on the web page, herein, the comment includes a comment content, and the comment that corresponds to the web page corresponding to the web page identifier can be searched out via the web page identifier.

Step S502: acquiring the corresponding web page content according to the web page identifier.

The browser at the terminal, just like an ordinary browser, includes an address bar for receiving a web page identifier (for example, a web page URL address). The terminal receives a web page identifier inputted by a user to the address bar of the browser, establishes a connection with the server, and acquires a web page content corresponding to the web page identifier from the server according to the web page identifier.

Step S503: displaying the web page content and providing a comment interaction entry.

The web page content is displayed on a first page of the browser at the terminal, and a comment interaction entry used for commenting on the web page content is provided at the first page.

For example, if the web page content requested by the browser is of a Hypertext Markup Language (HTML) format, the browser parses HTML and CSS, and displays the parse result on the first page. The comment interaction entry is arranged for the web page content at the browser, and the parse result of the web page content is displayed on a display of the terminal as a web page, i.e., the first page, on which the arranged comment interaction entry is displayed. The comment interaction entry may be displayed in various forms, for example, a button, a menu, etc., and used by the user to view comments corresponding to the web page. For example, a button is provided on the first page, and when the button is triggered, the browser receives a trigger signal and then sends a comment access request carrying the web page identifier of the displayed web page to the server; a communication connection is established between the terminal and the server, so that the server returns the comment corresponding to the web page identifier according to the web page identifier in the comment access request; the browser parses the comment returned by the server, and a parse result is displayed on the terminal display as another web page which is referred to as a second page. On the second page, merely comment contents are displayed, or both comment content and the attribute of the comment are displayed.

Step S504: detecting a trigger signal applied at the comment interaction entry.

Step S505: determining whether the trigger signal is received at the comment interaction entry; and if the trigger signal is received at the comment interaction entry, performing Step S506; otherwise, performing Step S504.

Step S506: acquiring a comment corresponding to the web page identifier from the server according to the web page identifier.

Because comments on various web pages are further stored on the server, the comment that corresponds to the web page corresponding to the web page identifier can be searched out through the web page identifier.

Step S507: displaying the comment on the second page.

Step S508: monitoring a comment control.

Step S509: determining whether a comment adding instruction is generated by the comment control; and if the comment adding instruction is generated by the comment control, performing Step S510; otherwise, performing Step S508.

Step S510: sending the comment content and the corresponding web page identifier to a server storing comments.

Moreover, the attribute of the added comment may also be sent to the server.

The attribute of the comment may include comment source information, for example, the user name of the browser at the terminal or the terminal identifier (for example, a mobile phone serial number). At this step, the user name of the browser or the terminal identifier is sent to the server along with the comment content. At Step S507, displaying the comment on the second page may further include: displaying the comment content of the comment and the user name of the browser or the terminal identifier on the second page.

Because the browser, which typically is an open tool, does not require a user to register or log on beforehand, the comment source information may be a terminal identifier in this embodiment.

Moreover, the attribute of the comment may further include comment time, so that different comments may be distinguished by the time when the comments are submitted. At this step, when the comment content is sent to the server, the current time is further sent to the server as the comment time of the comment content. At Step S507, displaying the comments on the second page may further include: displaying the comment time of the comment on the second page.

Moreover, the added comment may be a reply to a previous comment, in addition to the comment on the web page content corresponding to the web page identifier. Therefore, a comment that is a reply to another comment (which is referred to as a parent comment) is referred to as a sub-comment, and the attribute of the sub-comment further includes the identifier of the parent comment. In this case, acquiring a comment corresponding to the web page identifier from the server according to the web page identifier at Step S506 further include: acquiring the parent comment of each sub-comment; and displaying the comment on the second page at Step S507 further include: displaying all the sub-comments of each parent comment under the parent comment in a hierarchical manner, where subordinate sub-comments of a certain sub-comment, if any, are displayed under the sub-comment in a hierarchical manner, and so on.

Moreover, in order to instantaneously display the comment content submitted by the user, Step S506 is performed after Step S510.

Figure 7:
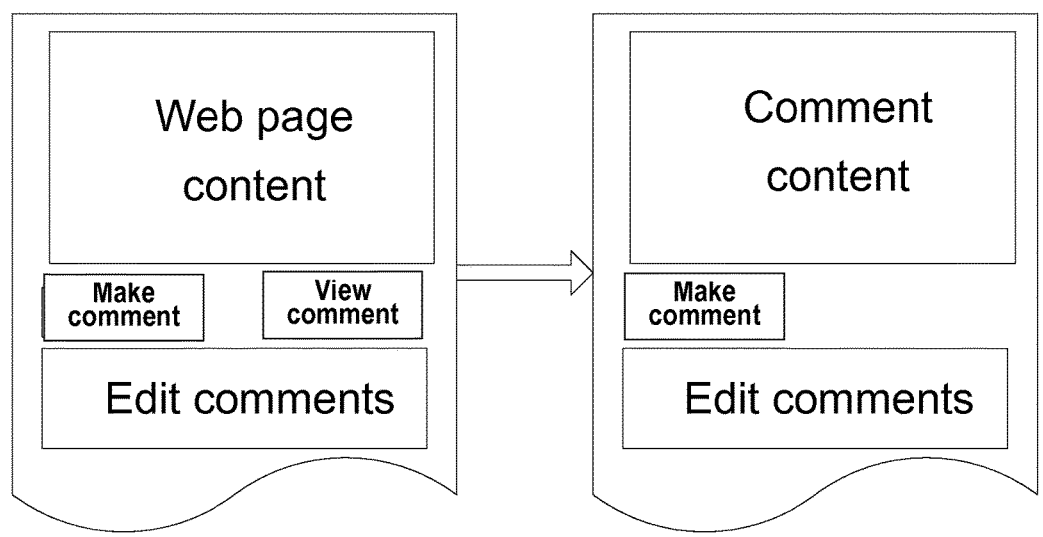
FIG. 7 is a schematic diagram showing the implementation of the method for web page commenting according to the still another embodiment of the disclosure.

In the method for web page commenting according to this embodiment, a schematic displayed page for the implementation of the method is shown in FIG. 7, and all modifications, equivalent substitutions and improvements made without departing from the concept and principle of the method according to this embodiment pertain to the scope of this embodiment.

In the method for web page commenting according to this embodiment, a comment interaction entry is provided on a web page that displays the web page content, in this case, when a user triggers the interaction entry, historical comments related to the web page are displayed on another page on which a comment editing and submitting interface is further provided. As a result, a user is allowed not only to view the comments made by other users on the web page content, but also to make a comment on the web page content.

Figure 8:
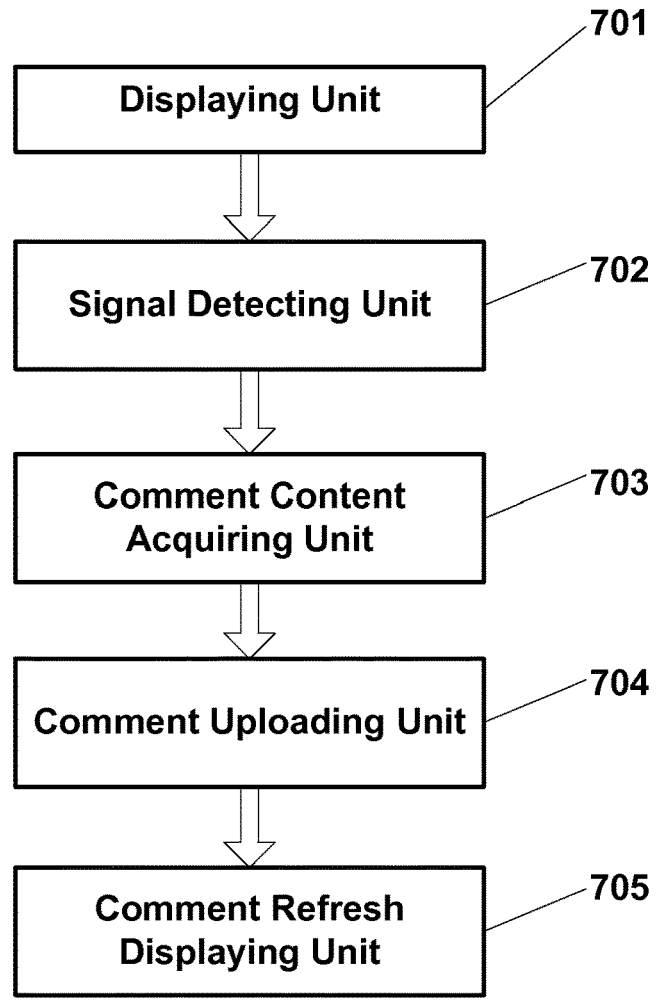
FIG. 8 is a structural block diagram of a browser according to yet another embodiment of the disclosure.

Still another embodiment provides a browser for implementing the method shown in FIG. 1. FIG. 8 is a structural block diagram of a browser according to the fourth embodiment of the disclosure. As shown in FIG. 8, the browser according to this embodiment includes: a displaying unit 701, a signal detecting unit 702, a comment content acquiring unit 703 and a comment uploading unit 704.

The displaying unit 701 is configured to display a web page content and provide a comment control for adding a comment containing a comment content on the web page content.

The displaying unit 701 displays a result of parsing the web page content by the browser at the terminal, and provides a comment control for adding a new comment.

For example, if the web page content as requested is of an HTML format, the browser is configured to parse HTML and CSS, and the displaying unit 701 displays the parse result on a displayed page of the browser. Meanwhile, the comment control for making a comment on the web page content is provided on the displayed page. For example, the comment control includes an editing control for editing the comment content of the new comment and a comment saving control for saving the new comment. For example, an editable text box functions as the editing control, and a button functions as the saving control, as specifically illustrated in the above method embodiment.

The signal detecting unit 702 is configured to detect a comment adding instruction generated by the comment control.

The comment content acquiring unit 703 is configured to acquire the comment content from the comment control if the comment adding instruction is detected.

The comment uploading unit 704 is configured to send the comment content and a web page identifier corresponding to the web page content to a server storing comments, where, each web page identifier uniquely identifies one web page, as specifically illustrated in the above method embodiment.

If the comment saving control is triggered, the comment uploading unit 704 sends the new comment to the server, where the comment content of the new comment is the content of the editing control.

In the browser according to this embodiment, a comment control for adding a new comment is provided on a web page when the web page content is displayed, so that a user can submit a comment on the web page content via the comment control; moreover, after submitting the comment on the web page content, the user can browse the comment history of the web page content via a comment interaction entry.

Moreover, the comment uploading unit 704 is further configured to upload the attribute of the comment to the server.

The attribute of the comment may include comment source information, for example, the user name of the browser at the terminal or the terminal identifier (for example, a mobile phone serial number). When the comment uploading unit 704 adds the new comment to the server, the comment source information such as the user name of the browser or the terminal identifier is added as well to the server.

Because the browser, which typically is an open tool, does not require a user to register or log on beforehand, the comment source information may be a terminal identifier in this embodiment.

Moreover, the attribute of the comment may further include comment time, so that different comments may be distinguished by the time when the comments are submitted. The comment uploading unit 704 sends the current time as the comment time to the server along with the new comment.

Moreover, the added comment may be a reply to a previous comment, in addition to the comment on the web page content corresponding to the web page identifier. Therefore, a comment that is a reply to another comment (which is referred to as a parent comment) is referred to as a sub-comment, and the attribute of the sub-comment further includes the identifier of the parent comment. Therefore, when sending a sub-comment, the comment uploading unit 704 further sends the parent comment of this sub-comment to the server, so that the server stores the parent comment of this sub-comment.

In order to enable a user to browse all the comments on the web page content corresponding to the web page identifier, the displaying unit 701 is further configured to: provide a comment interaction entry for receiving a trigger signal after displaying the web page content, acquire a comment corresponding to the web page identifier from the server according to the web page identifier if a trigger signal is received at the comment interaction entry, and display the comment corresponding to the web page identifier. Specifically, the comment interaction entry used for displaying all the comments on the web page content corresponding to the web page identifier may be provided on the displayed page; for example, a menu or a button is provided on the web page, and all the comments on the web page content corresponding to the web page identifier are displayed when the menu or button is triggered.

Optionally, the browser according to the embodiment of the disclosure further includes:

a comment acquiring unit, which is configured to acquire a comment corresponding to the web page identifier from the server according to the web page identifier, after the displaying unit 701 displays the web page content.

The displaying unit 701 is further configured to display the comments corresponding to the web page identifier that are acquired by the comment acquiring unit, after displaying the web page content.

Moreover, in order to instantaneously display the new comment submitted by the user, the browser further includes: a comment refresh displaying unit 705, which is configured to acquire a comment corresponding to the web page identifier from the server according to the web page identifier and display the comment corresponding to the web page identifier, after the comment uploading unit 704 sends the comment content and the corresponding web page identifier to the server storing comments. After the comment uploading unit 704 adds the new comment to the server, the comment refresh displaying unit 705 retrieves the comment newly added by the user from the server, and displays the historical comments and the new comment corresponding to the web page identifier together.

In the browser according to this embodiment, the displaying unit displays the historical comments of various users on a web page along with the displayed web page content, as well as a comment control for adding a new comment. The historical comments may be referred to by a user to decide whether to read the current web page content, and the comment control may be used by the user to submit a comment on the web page content, so that a user can view the comments made by other users on the web page content and make a comment on the web page content without registering or logging on via the browser according to the embodiment of the disclosure.

Figure 9:
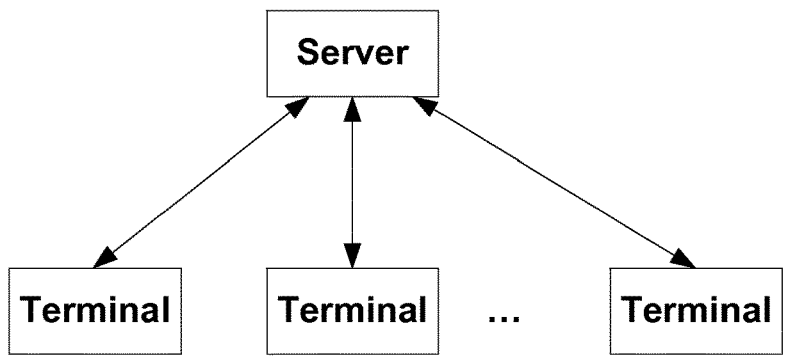
FIG. 9 is a structural block diagram of a system for web page commenting according to yet another embodiment of the disclosure.

Yet another embodiment provides a system for web page commenting. FIG. 9 is a structural block diagram of a system for web page commenting according to the present embodiment of the disclosure. As shown in FIG. 9, the system for web page commenting according to this embodiment includes a server and at least one terminal.

The terminal is configured to display a web page content and provide a comment control for adding a comment on the web page content, and detect a comment adding instruction generated by the comment control, where the added comment contains a comment content.

If the terminal detects the comment adding instruction, the terminal acquires the comment content from the comment control and sends the comment content and a web page identifier corresponding to the web page content to a server storing comments, where, each web page identifier uniquely identifies one web page.

The server is configured to receive and store the comment content and the web page identifier corresponding to the web page content.

The server is a WWW server, and the terminal is a terminal with a browser. Generally, the server is capable of querying, according to a web page identifier (for example, a web address) of a web page to be accessed, the web page content corresponding to a web page identifier, just like an ordinary WWW server, but further storing comments on the web page, herein, the comment includes a comment content, and the comment that corresponds to the web page corresponding to the web page identifier can be searched out via the web page identifier.

Like an ordinary browser, the browser at the terminal includes an address bar for receiving a web page identifier (for example, the URL address of a web page), the terminal receives a web page identifier inputted by the user, and acquires a web page content corresponding to the web page identifier from a web site server corresponding to the web page identifier, according to the web page identifier.

The terminal displays the web page content on a web page of the browser and provides a comment control for adding new comments, and the comment control may include an editing control (for example, an editable text box) for editing the comment contents of new comments and a comment saving control (for example, a button) for saving the new comments. For example, a control for text editing is provided along with a button below the web page content on a web page of the browser at the terminal, to enable the user to add and submit a comment content.

Because the browser, which typically is an open tool, does not require a user to register or log on beforehand, the comment source information may be a terminal identifier in this embodiment.

Moreover, the terminal further sends an attribute of the comment to the server.

As specifically illustrated in the above method embodiment, the attribute of the comment may include at least one of comment source information and comment time. For example, a comment time of the comment is sent to the server, different comments may be distinguished by the time when the comments are respectively submitted. At this step, when the new comment is sent to the server, the current time is also sent as the comment time.

Moreover, the added comment may be a reply to a previous comment, in addition to the comment on the web page content corresponding to the web page identifier. Therefore, a comment that is a reply to another comment (which is referred to as a parent comment) is referred to as a sub-comment, and the attribute of the sub-comment further includes the identifier of the parent comment. Thus, at this step, the parent comment of a sub-comment needs to be stored along with the sub-comment.

In order to enable a terminal user to browse all the comments on the web page content corresponding to the web page identifier, a comment interaction entry used for displaying all the comments on the web page content corresponding to the web page identifier may be provided on the page. For example, a menu or a button is provided on a web page at the terminal, so that all the comments on the web page content corresponding to the web page identifier are displayed when the menu or button is triggered. Moreover, after the client (i.e. the terminal) sends the comment to the server, the client retrieves comments corresponding to the web page identifier from the server and displays the retrieved comments, so that the comment submitted by the user via the terminal can be displayed in time.

In the system for web page commenting according to this embodiment, comments on various web pages are stored on the server and a comment control for adding a new comment is displayed at the client along with the displayed web page content, so that a user may submit a comment on the web page content via the comment control; moreover, after the user submits the comment on the web page content, the user can browse the historical comments on the web page content.

An embodiment of the disclosure provides a storage medium containing computer-executable instructions, which, when executed by a computer processor, are configured to perform a method for web page commenting, and the method includes:

displaying a web page content and providing a comment control used for adding a comment containing a comment content on the web page content;

detecting a comment adding instruction generated by the comment control;

acquiring the comment content from the comment control, in response to the detected comment adding instruction; and sending the comment content and a web page identifier corresponding to the web page content to a server storing comments, where each web page identifier uniquely identifies one web page.

In an embodiment, the added comment includes a reply to a comment.

In an embodiment, after displaying the web page content, the method further includes: providing a comment interaction entry used for receiving a trigger signal, acquiring, according to the web page identifier corresponding to the web page content, a comment corresponding to the web page identifier from the server if the trigger signal is received at the comment interaction entry, and displaying the comment corresponding to the web page identifier.

In an embodiment, before displaying the web page content, the method further includes: acquiring, according to the web page identifier corresponding to the web page content, a comment corresponding to the web page identifier from the server.

In an embodiment, after displaying the web page content, the method further includes: displaying the comment corresponding to the web page identifier.

In an embodiment, after sending the comment content and a web page identifier corresponding to the web page content to a server storing comments, the method further includes: retrieving comments corresponding to the web page identifier from the server according to the web page identifier, and displaying the comments corresponding to the web page identifier.

In an embodiment, the method further includes: displaying an attribute of the comment corresponding to the web page identifier.

In an embodiment, the attribute of the comment corresponding to the web page identifier includes at least one of comment source information and comment time.

All or a part of the technical solutions according to the above embodiments may be implemented by software programming, and a software program therefor may be stored in a non-transitory computer-readable storage medium, for example, a hard disk, a compact disk or a floppy disk of a computer.

The above description only shows some preferred embodiments of the disclosure, rather than limiting the scope of the disclosure. All modifications, equivalent substitutions, improvements, and so on that are made without departing from the concept and principles of the disclosure should be contemplated by the protection scope of the disclosure.

What is claimed is:

1. A method for web page commenting which is operable on a terminal, wherein, the method comprises:
    displaying a web page content on a first page and providing a comment control used for adding a comment on the web page content, wherein the added comment contains a comment content, and wherein the web page content is obtained from a web page server;
    detecting a comment adding instruction generated at the comment control;
    acquiring the comment content from the comment control in response to the detected comment adding instruction;
    sending the comment content and a web page identifier corresponding to the web page content to a server storing comments, wherein each web page identifier uniquely identifies one web page; and
    after displaying the web page content on the first page:
        providing a comment interaction entry used for receiving a trigger signal on the first page, the comment interaction entry including one or more selection options,
        based on a selection of the one or more selection options that causes the trigger signal being received at the comment interaction entry, acquiring one or more historical comments that correspond to the web page identifier corresponding to the web page content from the server according to the web page identifier, and
        displaying the historical comments corresponding to the web page identifier on a second page.

2. The method according to claim 1, wherein, the added comment comprises a reply to a comment.

3. The method according to claim 2, further comprising, after sending the comment content and a web page identifier corresponding to the web page content to a server storing comments, acquiring a comment corresponding to the web page identifier from the server according to the web page identifier, and displaying the comment corresponding to the web page identifier.

4. The method according to claim 1, further comprising:
    before displaying the web page content, acquiring a comment that corresponds to the web page identifier corresponding to the web page content from the server according to the web page identifier; and after displaying the web page content, displaying the comment corresponding to the web page identifier.

5. The method according to claim 1, further comprising, after sending the comment content and a web page identifier corresponding to the web page content to a server storing comments, acquiring a comment corresponding to the web page identifier from the server according to the web page identifier, and displaying the comment corresponding to the web page identifier.

6. The method according to claim 5, further comprising: displaying an attribute of the comment corresponding to the web page identifier.

7. The method according to claim 6, wherein, the attribute of the comment corresponding to the web page identifier comprises a mobile phone serial number.

8. The method according to claim 1, further comprising, after sending the comment content and a web page identifier corresponding to the web page content to a server storing comments, acquiring a comment corresponding to the web page identifier from the server according to the web page identifier, and displaying the comment corresponding to the web page identifier.

9. The method according to claim 1, wherein after detecting the comment adding instruction, the comment content and the web page identifier corresponding to the web page content are sent by the terminal to the server storing comments.

10. A terminal, comprising at least one processor and a memory having processor-executable instructions stored therein, the instructions when executed by the at least one processor, configure the terminal to:
  display a web page content on a first page and provide a comment control used for adding a comment on the web page content, wherein the added comment contains a comment content;
  detect a comment adding instruction generated at the comment control;
  acquire comment content from the comment control in response to the detected comment adding instruction;
  send the comment content and a web page identifier corresponding to the web page content to a server storing comments, wherein, each web page identifier uniquely identifies one web page; and
  after displaying the web page content on the first page:
    provide a comment interaction entry used for receiving a trigger signal on the first page, the comment interaction entry including one or more selection options,
    based on a selection of the one or more selection options that causes the trigger signal being received at the comment interaction entry, acquire one or more historical comments that correspond to the web page identifier corresponding to the web page content from the server according to the web page identifier, and
    display the historical comments corresponding to the web page identifier on a second page.

11. The terminal according to claim 10, wherein, the comment further comprises a reply to a comment.

12. The terminal according to claim 11, wherein the terminal is further configured to:
  retrieve comments corresponding to the web page identifier from the server according to the web page identifier after sending a comment content and the web page identifier corresponding to the web page content to a server storing comments, and display the retrieved comments corresponding to the web page identifier.

13. The terminal according to claim 10, wherein the terminal is further configured to
  acquire, according to the web page identifier corresponding to the web page content, a comment corresponding to the web page identifier from the server before the terminal displays the web page content; and
  display the comment corresponding to the web page identifier which is acquired by the terminal, after displaying the web page content.

14. The terminal according to claim 10, wherein the terminal is further configured to
  retrieve comments corresponding to the web page identifier from the server according to the web page identifier after sending a comment content and the web page identifier corresponding to the web page content to a server storing comments, and display the retrieved comments corresponding to the web page identifier.

15. The browser according to claim 14, wherein, the displaying unit is further configured to display an attribute of the comment corresponding to the web page identifier.

16. The terminal according to claim 15, wherein, the attribute of the comment corresponding to the web page identifier which is displayed by the terminal comprises a mobile phone serial number.

17. The terminal according to claim 10, wherein the terminal is further configured to retrieve comments corresponding to the web page identifier from the server according to the web page identifier after sending a comment content and the web page identifier corresponding to the web page content to a server storing comments, and display the retrieved comments corresponding to the web page identifier.

18. A system for web page commenting, comprising a server and at least one terminal, wherein:
  the terminal is configured to display a web page content on a first page and provide a comment control used for adding a comment on the web page content, and detect a comment adding instruction generated by the comment control, wherein the added comment contains a comment content;
  the terminal is further configured to:
    based on detection of the comment adding instruction, acquire comment content from the comment control,
    send the comment content and a web page identifier corresponding to the web page content to a server storing comments, wherein, each web page identifier uniquely identifies one web page,
    after displaying the web page content on the first page, provide a comment interaction entry used for receiving a trigger signal on the first page, the comment interaction entry including one or more selection options,
    based on a selection of the one or more selection options that causes the trigger signal being received at the comment interaction entry, acquire one or more historical comments that correspond to the web page identifier corresponding to the web page content from the server according to the web page identifier, and
    display the historical comments corresponding to the web page identifier on a second page; and
  the server is configured to receive and store the comment content and the web page identifier corresponding to the web page content.

* * * * *